United States Patent [19]

Fickelscher

[11] 4,213,835

[45] Jul. 22, 1980

[54] METHOD FOR ELECTROLYTICALLY ETCHING OF A RECRYSTALLIZED ALUMINUM FOIL

[75] Inventor: Horst Fickelscher, Heidenheim, Fed. Rep. of Germany

[73] Assignee: Siemens Aktiengesellschaft, Berlin & Munich, Fed. Rep. of Germany

[21] Appl. No.: 2,966

[22] Filed: Jan. 12, 1979

[30] Foreign Application Priority Data

Jan. 12, 1978 [DE] Fed. Rep. of Germany ....... 2801218

[51] Int. Cl.² ............................................. C25F 3/04
[52] U.S. Cl. .......................... 204/129.25; 204/129.75
[58] Field of Search ...................... 204/129.25, 129.75, 204/129.1, 129.2

[56] References Cited

U.S. PATENT DOCUMENTS

| 3,876,479 | 4/1975 | Yamada | 204/129.1 X |
| 3,935,080 | 1/1976 | Gumbinner et al. | 204/129.1 X |
| 3,980,539 | 9/1976 | Lloyd et al. | 204/129.1 X |

FOREIGN PATENT DOCUMENTS

| 1592815 | 6/1970 | France | 204/129.1 |
| 51-8132 | 1/1976 | Japan | 204/129.1 |
| 970572 | 9/1964 | United Kingdom | 204/129.1 |

Primary Examiner—John H. Mack
Assistant Examiner—D. R. Valentine
Attorney, Agent, or Firm—Hill, Van Santen, Steadman, Chiara & Simpson

[57] ABSTRACT

A method of etching a recrystallized aluminum foil which utilizes potentiostatic etching to roughen the foil to obtain a particularly high roughening factor. The etching preferably occurs in two stages in which the etching current density of the first stage is above the current density which creates an undesired pitting of the aluminum and a second stage which utilizes an etching current density which is below the density which creates pitting of the aluminum.

4 Claims, 2 Drawing Figures

METHOD FOR ELECTROLYTICALLY ETCHING OF A RECRYSTALLIZED ALUMINUM FOIL

BACKGROUND OF THE INVENTION

The present invention is directed to a method for the electrolytic etching of a recrystallized aluminum foil and the application of the foil.

In electrolytically etching aluminum foils, an enlargement of a surface area will occur. As a result of this enlargement of the surface area, electrolytic capacitors, which are manufactured with the etched foils, can obtain a given capacity with a smaller volume than an electrolytic capacitor, which utilizes a foil with the non-roughened surface or unetched surface.

Aluminum foils, which have been roughened according to previously known etching methods or techniques, exhibit in addition to the regular tunnel-like etching structure, undesirable overlays of irregular pitting which pitting is structurally too coarsely porous. As a result, only about 10–60% of the mathematically possible capacitance multiplication factors, which are obtained with an idealized etching structure, can be obtained in relation to the aluminum electrolytically stripped from the etched foil. The ideal etching structure is a pure tunnel etching with defined and uniform tunnel diameters and without any undesirable pitting of the foil.

It is known to achieve pure tunnel etching structures without coarse pitting in recrystallized aluminum by utilizing a very low etching current density in the magnitude of 10 mA/cm$^2$. However, the tunnel densities, which are achieved with the low current densities that are utilized with known etching techniques, fall extremely short of a required value of $> 10^7$ tunnels/cm$^2$ of foil surface, which value is required to achieve a high surface capacitance multiplication factor.

It is indeed further known that tunnel density can be increased with an increased etching current density. However, this is only possible when one will accept an increasing coarser and more irregular pitting of the aluminum foil. The known etching methods are therefore a compromise between the highest possible tunnel density and a relatively tolerable portion or amount of irregular pitting that is structurally too large. Therefore, the limits of the possible roughening factor with given foil thicknesses and aluminum erosion rates are far from being obtained particularly for aluminum foils which are employed in low voltage electrolytic capacitors.

SUMMARY OF THE INVENTION

The object of the present invention is to provide an electrolytic etching method for recrystallized aluminum foils which allows the manufacture of aluminum foils with exclusively pure cylindrical or cubical etching tunnel structures with a single pore diameter d and with tunnel densities $> 10^7$/cm$^2$ of foil surface with an avoidance of irregular pitting of the foil. The dimensions of the tunnel diameter d thereby amount to approximately $d = 2k \times U$; wherein U is the actuation or forming voltage in volts and $k = 0.0013$ $\mu$m/V as the oxide barrier layer thickness/volts of the actuation voltage.

These objects and tasks are inventively achieved in an etching method including the step of providing an etching bath, positioning the foil in the bath and by potentiostatically etching the foil with a temporally constant anode potential. Advantageously, the etching is carried out in a traveling bath having suitable electrode geometry to be approximately quasipotentiostatic etching with respect to the current density curve for the electrode geometry. In accordance with a further development of the method, the etching step occurs in two stages with the etching current density in the first stage being above the potential or current density which creates pitting of the aluminum and in the second stage being reduced to below the current density which creates pitting of the aluminum.

The embodiment of the invention preferably utilizes an etching bath containing chloride ions.

The aluminum foil which is manufactured in accordance with the inventive method can be utilized as the electrode foils in electrolytic capacitors.

The advantages of the inventive method consists in that the etching tunnel structure with a tunnel density greater than $10^7$/cm$^2$ of the foil surface are obtained with avoidance of irregular pitting, and the etching tunnels are statistically uniformly distributed over the foil and the entire material. The etching or tunnel diameter d required for a planned forming voltage is primarily determined by the electrolytic aluminum erosion rate, which usually amounts to 20–40% of the original foil weight. With the help of the inventive method, the highest possible foil roughening and thus capacitance enlargement with the smallest possible aluminum erosion is obtained with a guarantee of sufficient foil strength.

DESCRIPTION OF THE PREFERRED EMBODIMENTS

The principles of the present invention are particularly useful in etching a recrystallized aluminum foil, which is an aluminum having a purity of approximately 99.99%, in an etching bath containing chloride ions to produce the tunnel-like structure in the foil.

Figure 1:
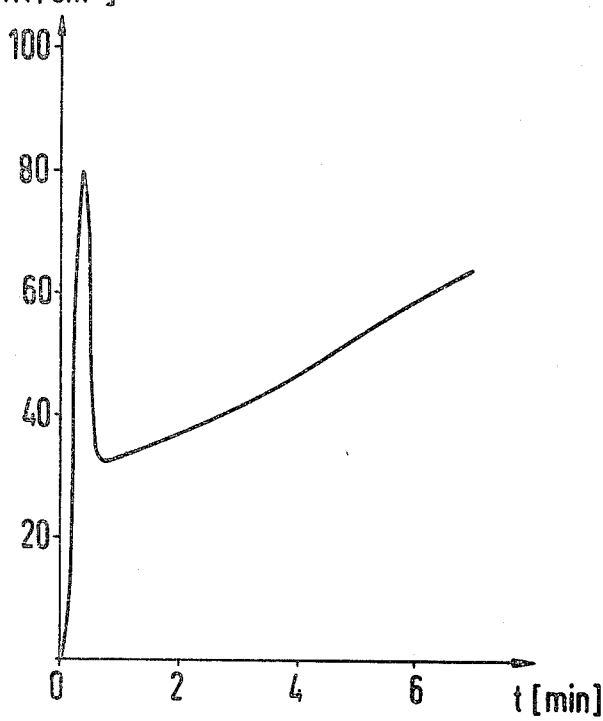
FIG. 1 is a characteristic curve of an etching current density j as a function of time during etching of a recrystallized aluminum foil in an etching bath containing chloride ions at a given constant anode potential.
Figure 2:
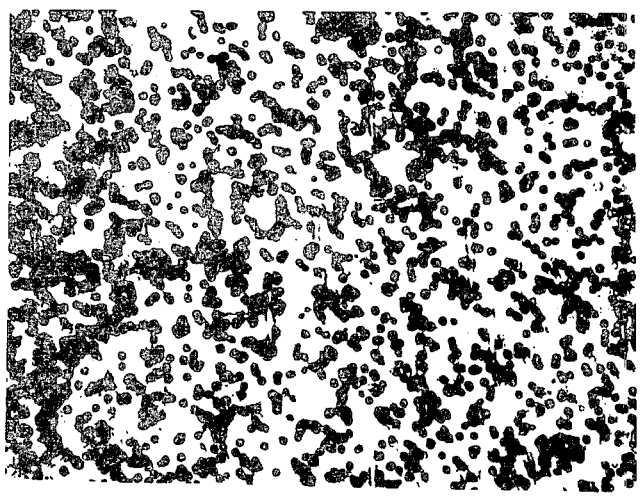
FIG. 2 is a microscopic surface image of a foil etched according to the method of the present invention (example I) at an enlargement of 1000$\times$.

As can be seen from FIG. 1, an etching current density for a given anode potential and bath will rise steeply for a short time to a maximum. After reaching the maximum it decreases rapidly and then begins to rise or increase at a constant rate. Analysis of this unusual current density curve shows that the tunnel structure being produced is fixed within the first minute of the electrolytic etching in the range of the first current density maximum. Thereby, after an induction period of around 10 seconds, the etching tunnels grow autocatalytically with a pore diameter of approximately 0.2 $\mu$m in the recrystallized aluminum lattice in a crystal oriented 100 direction with growth velocities of a few $\mu$m/s or a growth velocity which is equivalent to the growth velocities produced by an etching current density in the order of 100 A/cm$^2$. A monotonic current density rise follows upon the current density maximum which current density rise upon a suitable selection of the anode potential exactly reflects the growth of the surface enlargement, which includes the tunnel enlargement without pitting.

Thus, the tunnel density is considerably determined by the extreme etching current density in the initial phase of the etching process. The tunnel density grows approximately proportional to a specific maximum value of the etching current density. Upon passing this value for the etching current density, a decline in the tunnel density and an additional coarse pitting ensures as a results of a passivation phenomena.

After the process of exclusive tunnel formation has been terminated which occurs after approximately one minute at the most and in order to avoid the occurrence of irregular and more or less coarse pitting which now normally occurs, the etching current density is limited to such a degree by reducing anode potential that only a uniform aluminum dissolution and thus a pore or tunnel enlargement up to the desired value will occur. Therefore, the etching time for the pore or tunnel enlargement is relatively long in relation to the etching time for obtaining the pore structure in the foil whence the uniformity of the pore diameter for all etching pores results in the inventive method.

EXAMPLE I

A 75 $\mu$m thick recrystallized aluminum foil, which has a purity of 99.99 is etched. The help of the inventive method in a 1 normal pure chloride solution with a specific charge of 30 C/cm$^2$. With the etched aluminum foil produced by the method is then constructed a capacitor and is formed at a voltage of 400 V so that one will obtain a specific capacity of 0.60 $\mu$F/cm$^2$. A capacitor with an aluminum foil etched in the previously known etching processes when formed under these same conditions will only have a specific capacity of 0.45 $\mu$F/cm$^2$.

EXAMPLE II

A 100 $\mu$m thick recrystallized aluminum foil, which has a purity of 99.99, is etched in accordance with the inventive etching method with a specific charge of 50 C/cm$^2$ is then constructed an electrolytic capacitor and formed at a voltage of 400 V. The capacitor will have a specific capacity of 0.74 $\mu$F/cm$^2$. A capacitor constructed in a similar manner using a foil etched by the previously known methods when formed at the same voltage will have a specific capacity of 0.56 $\mu$F/cm$^2$.

From the above examples, it is obvious that foils etched in accordance with the present invention can be utilized in electrolytic capacitors and have a higher specific capacitance per cm$^2$. Thus, to obtain a given capacitance, the capacitor can have a smaller volume or for the same volume, can have a higher capacitance.

Although various minor modifications may be suggested by those versed in the art, it should be understood that I wish to embody within the scope of the patent warranted hereon, all such modifications as reasonably and properly come within the scope of my contribution to the art.

I claim:

1. A method for electrolytically etching of a recrystallized aluminum foil comprising the steps of providing an etching bath with suitable electrode geometry for etching the foil approximately quasipotentiostatic according to the current density being attained when a constant anode potential is applied, positioning the foil in the bath, and potentiostatically etching the foil with a temporally constant anode potential, the step of etching including applying an anode potential for creating a current density above the current density for creating pitting of the aluminum during a first etching stage and in a following second etching stage reducing the anode potential to create a current density below the density at which pitting occurs.

2. A method according to claim 1, wherein the etching bath contains chloride ions.

3. A method for electrolytically etching of a recrystallized aluminum foil comprising the steps of providing an etching bath, positioning the foil in the bath, and potentiostatically etching the foil with a temporally constant anode potential, the step of etching comprising performing a first etching stage with an etching current density which is above the current density for creating pitting in the aluminum and then performing a second etching stage wherein the etching current density is maintained below said current density for creating pitting in the aluminum.

4. A method according to claim 3, wherein the etching bath contains chloride ions.

* * * * *